United States Patent [19]
Alberini

[11] Patent Number: 5,524,330
[45] Date of Patent: Jun. 11, 1996

[54] CAPTIVE SCREW ELECTRONIC FACE PLATE ASSEMBLY

[75] Inventor: Robert L. Alberini, Ashland, Mass.

[73] Assignee: 3Com Corporation, Santa Clara, Calif.

[21] Appl. No.: 292,236

[22] Filed: Aug. 17, 1994

[51] Int. Cl.⁶ .................................................. B23P 11/00
[52] U.S. Cl. ........................ 29/437; 29/513; 174/66; 220/241
[58] Field of Search ..................... 29/437, 243.5, 29/243.517, 513; 174/66, 67; 220/241, 242, 328; 439/892

[56] References Cited

U.S. PATENT DOCUMENTS

| | | | |
|---|---|---|---|
| 1,854,730 | 4/1932 | Bell | 29/437 |
| 3,060,562 | 10/1962 | Fransson | 29/437 |
| 3,892,031 | 7/1975 | Bisbing | 29/437 |
| 4,355,198 | 10/1982 | Gartland, Jr. | 174/66 |
| 5,256,019 | 10/1993 | Phillips, II | 29/437 |

FOREIGN PATENT DOCUMENTS

| | | | |
|---|---|---|---|
| 272199 | 12/1991 | Japan | 174/66 |

*Primary Examiner*—David P. Bryant
*Attorney, Agent, or Firm*—McGlew and Tuttle

[57] ABSTRACT

An electronics component face plate and captured screw assembly and method of forming the assembly. A face plate of sheet metal, such as one provided with indicia (providing source information or information as to indicators, connection elements or controls) is provided with a hole of a diameter sized to correspond to a portion of a screw, between a screw head and screw threading wherein the threading has a diameter greater than the hole. A tab structure is cut into the metal in a circular pattern in a region surrounding the hole. Tabs are formed by removing portions of the metal to leave a portion of the metal surrounded on each side by an area wherein the metal has been removed. The tabs are then pressed upwardly. In doing this, the original hole with the diameter as noted above, expands somewhat such that the threaded area of the screw can be inserted through the hole. Subsequently, an anvil with a hole drilled therein is positioned below the face plate wherein the screw threaded portion is inserted through the hole in the anvil with the sheet metal face plate placed over the anvil. Pressure is applied at the head of the screw whereby the raised up portion in the tab region is flattened to its original shape whereby the screw is captured with the head of the screw being maintained on one side of the face plate and the threaded portion of the screw maintained on the other side of the face plate.

12 Claims, 2 Drawing Sheets

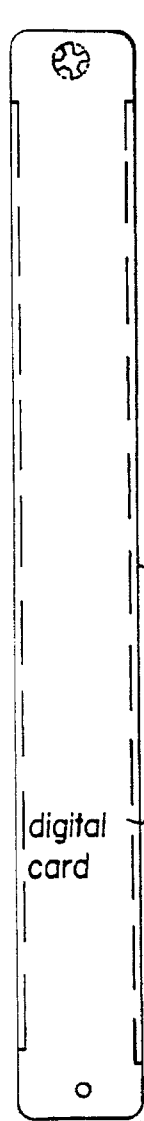
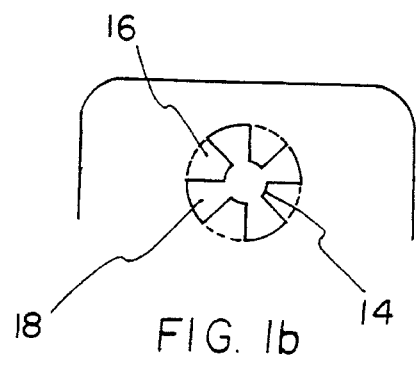
FIG. 1b
FIG. 1a
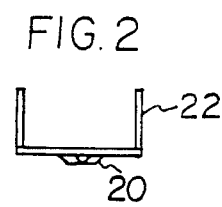
FIG. 2
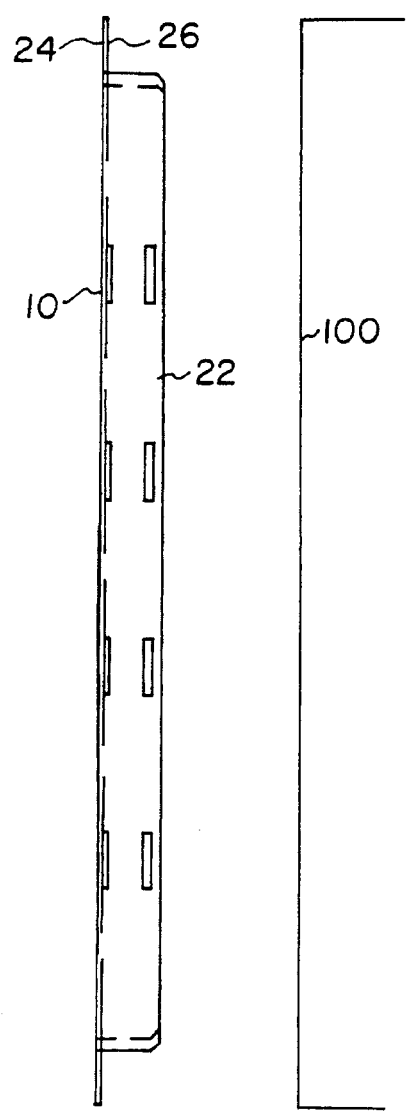
FIG. 3

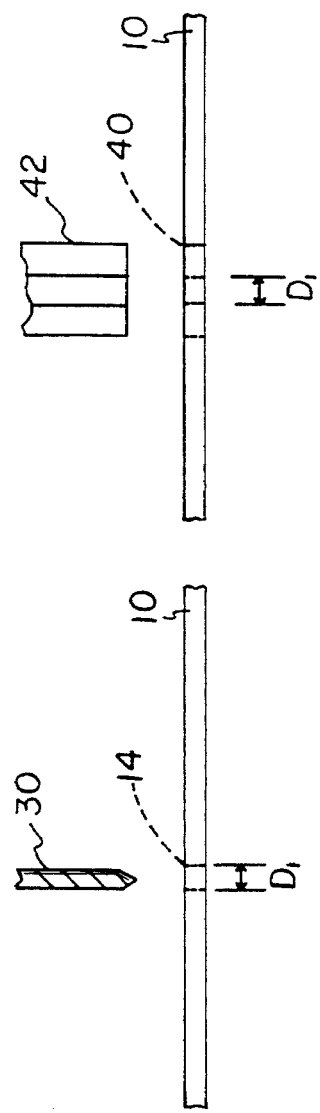
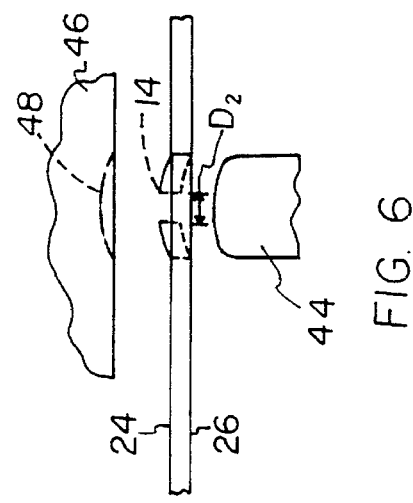
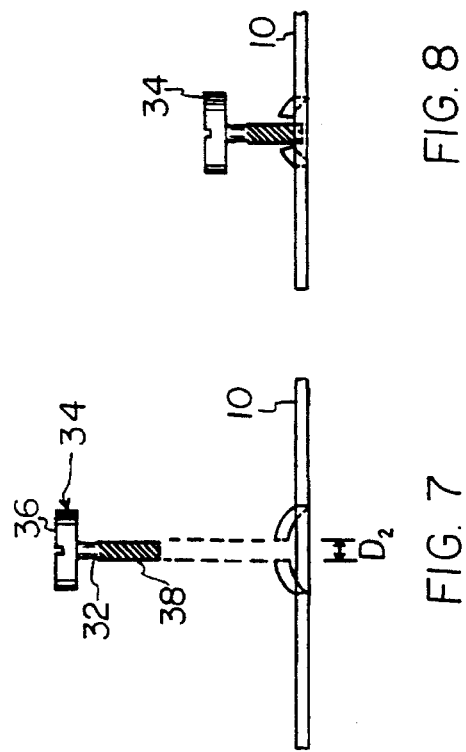
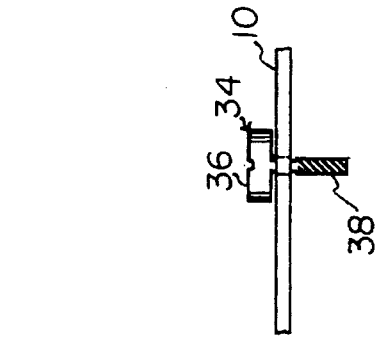

CAPTIVE SCREW ELECTRONIC FACE PLATE ASSEMBLY

FIELD OF THE INVENTION

The present invention relates to the field of connectors for sheet metal plates, particularly face plates for electronics such as electronic equipment used in communications applications and other related electronics applications.

SUMMARY AND BACKGROUND OF THE INVENTION

Face plates made of sheet metal and provided with indicia are typically used with electronics equipment. For example, rack mounted electronics equipment is often used wherein a component to be mounted in the rack or housing is provided with a face plate. Such face plates may be used to provide indicia the form of information as to both the source of the component (trademark information and the like) as well as information as to the nature of the product and the nature of indicators and outlets and controls and the like. Face plates are often used wherein a company manufactures a product and various other companies distribute the product under their own name.

The use of such face plates provides a great deal of flexibility as to changes in the indicia, such as changes as to the source and changes as to other information which is to be provided on the face plate. However, the amount of time required to affix face plates presents a disadvantage with regard to their use. In the past, face plates have been affixed by individual screws wherein the face plate and the screws represent components which have to be manipulated separately. It can be difficult to manipulate the screws and face plates with regard to aligning the screw with a hole provided in the face plate and with a receiving portion in the element to which the face plate is to be attached.

SUMMARY AND OBJECTS OF THE INVENTION

It is an object of the invention to provide a simple process and arrangement wherein a face plate may be provided with a fixing means, such as a screw fixedly associated with the face plate, wherein the face plate and fixation means does not represent an expensive assembly and wherein the assembly can be formed by an efficient process which provides a structure which can be readily used for further processing such as connecting the assembly to an electronic component.

According to the invention, the process comprises forming a face plate of sheet metal wherein the face plate is either printed with indicia or the like (providing source information or information as to indicators, connection elements or controls) or wherein the face plate is to have indicia printed on it in the future. A hole is provided in the face plate wherein the hole has a diameter sized to correspond to a portion of a screw, between a screw head and screw threading wherein the threading has a diameter greater than the hole (the diameter of the hole is such as to fit around the undercut in the screw). A tab structure is then cut into the metal in a circular pattern in a region surrounding the hole. The tab design is formed by removing portions of the metal to leave a portion of the metal surrounded on each side by an area wherein the metal has been removed. The tab design provides a circular pattern which is approximately 2.85 times larger than the original hole wherein 50% of the metal has been removed in this area. The tab portions are then pressed upwardly or formed up from below the drilled and stamped sheet of sheet metal (such as sheet steel). In doing this, the original hole with the diameter as noted above, expands somewhat such that the threaded area of the screw can be inserted through the hole. Subsequently, an anvil with a hole provided therein is positioned below the sheet steel wherein the screw threaded portion is inserted through the hole in the anvil with the sheet metal face plate placed over the anvil. This allows the hole of the sheet steel and the hole of the anvil to be aligned (the drilled hole with the defined diameter of the sheet metal face plate being aligned with the hole in the anvil). Pressure is applied at the head of the screw whereby the raised up portion in the tab region (swaged area) is flattened to its original shape whereby the screw is captured with the head of the screw being maintained on one side of the face plate and the threaded portion of the screw maintained on the other side of the face plate.

The invention further provides a face plate and screw assembly whereby means are provided for capturing the screw to maintain the screw attached to the face plate.

According to further aspects of the invention, the face plate may be either subsequently provided with indicia or the face plate already provided with indicia and with the captive screw is applied to an electronic component such as a component to be mounted on a rack or in a housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1a is a front view of a face plate machined to a state wherein it is ready for accepting a screw to capture the screw thereon;

FIG. 1b is an enlarged view of the tab region of the face plate;

FIG. 2 is a top view of the face plate of FIG. 1;

FIG. 3 is a side view of the face plate of FIG. 1 showing an electronic component to which the face plate is to be connected;

FIG. 4 is a schematic view of the face plate wherein a hole of a defined diameter has been formed therein;

FIG. 5 is a schematic view illustrating the machining of the sheet metal face plate, with hole, to provide a tab design of a circular pattern, surrounding the hole;

FIG. 6 is a schematic view showing the machining of the tab area to raise the tab area and increase the diameter at the defined diameter hole;

FIG. 7 is a schematic view showing the insertion of the screw into the hole of the machined sheet metal face plate;

FIG. 8 is a schematic view showing the machined face plate with inserted screw, prior to the screw being captured;

FIG. 9 is a schematic view showing the step of exerting pressure on the screw head wherein the screw is captured in the sheet metal face plate; and FIG. 10 is a schematic view showing the finished assembly with sheet metal face plate and captured screw.

DETAILED DESCRIPTION OF THE PREFERRED EMBODIMENTS

Referring to the drawings in particular, the invention comprises a method for forming a sheet metal face plate with a captured screw and relates to a sheet metal face plate and captured screw assembly. As can be seen in FIG. 1, a sheet metal face plate 10 is provided wherein the face plate has a front face which may be provided with indicia or the like 12. The indicia may be for example indicia as to the origin (trademark, etc.) of the product or it may also be indicia providing an explanation as to display elements (LED's), connection ports or control elements. The face plate is provided with a drilled (or otherwise formed) hole 14 as best seen in FIG. 1B. The region surrounding the drilled hole of defined diameter is subsequently machined to provide a tab region wherein the tab pattern is provided by removing 50% of the material. This provides a plurality of tabs 16 (4 according to the preferred embodiment) wherein each tab has an area wherein material has been removed at each side of the tab (area of removed material 18).

As can best be seen in FIG. 2, the tabbed region is pressed from one side so as to raise the tab elements toward the direction of the front of the face plate. This raised portion 20 is formed by pressing the tab region from the rear side of the face plate. By forming the raised region 20, the defined diameter (based on the drilled hole), is changed, such that the opening provided is larger, thereby allowing the threading of a screw to pass through the opening.

As can be seen in FIG. 3, the face plate may merely be a sheet metal piece such as sheet steel and may have side elements 22 which are provided to extend over the sides of an electronic component. Such an electronic component is shown in FIG. 3. As can be seen, the face plate 10 is positioned on the component 100 with the front face 24 providing a new face or new front face to the component. Likewise, the underside or rear face 26 covers or abuts the original face of the component.

The process according to the invention is based on forming a sheet metal piece generally as shown in FIG. 3 and drilling or otherwise machining a hole in the sheet metal face as shown in FIG. 4. A drill element 30 is used in order to provide a hole 14 of a defined diameter $D_1$. The diameter $D_1$ is selected to be that diameter which is slightly to an undercut region 32 of a screw generally designated 34 (see FIG. 7). The screw 34 has a screw head region 36 and a screw threaded region 38 wherein the screw threaded region 38 is at one side of the undercut 32 and the screw head 36 is at the other side of the undercut region 32. The undercut region 32 has a diameter which is smaller than the diameter $D_1$ wherein the threaded region 38 and screw head 36 have diameters which are greater than the defined diameter $D_1$.

After providing a hole 14, the sheet metal part is further machined to create a tab structure formed of tab element 16 and based on areas of removed material 18. The tab region is designated 40 in FIG. 5. The tab region may be machined using various different known techniques such as by stamping the sheet metal to remove material in the regions 18. A punch element 42 having the shape of the combined portions 18 is shown in FIG. 5. The tab region itself is approximately 2.85 times larger than the area of the original hole 14. According to the preferred design of the tab region, the tabs 16 account for 50% of the tab region and the removed portions 18 account for 50% of the tab region.

As is shown in FIG. 6, the tab elements 16, the material remaining in the tab region, is formed up by pressing the inside 26 of the sheet metal piece. This is shown schematically by using a pressing element 44 with an anvil element 46 with a receiving region 48 whereby the tab elements may be pushed outwardly to form the raised portion 20 as shown in FIG. 2. This process step results in an increase in the diameter of the hole 14. This is based on hole 14 having a new diameter $D_2$ as shown in FIG. 6. The screw 34 is then inserted into the opening 14 of diameter $D_2$. This is shown schematically in FIG. 7. The inserted screw 34 is shown seated in its position for further processing in FIG. 8. Next, an anvil 50 with a hole or a bore (a slot could also be used) is positioned underneath the sheet material (on the inner side 26) and pressure is applied to the screw head 36 by suitable pressure application means 54. This causes the screw head to move downwardly and causes the raised portion 20 to be flattened thereby capturing the screw 34 as shown in FIG. 10. Specifically, the screw head 36 is maintained on one side of the face plate 10 and the threaded portion 38 is maintained on an opposite side (inside 26) of the face plate 10. By the pressure application as shown in FIG. 9, the diameter of hole 14 returns to its original size $D_1$ whereby the screw is captured.

Several face plates may be processed as described above and may be maintained in readiness. As noted, the indicia may be applied before or after the screw capture as noted and when needed, the face plates may be screwed onto the electronic equipment 100.

While a specific embodiment of the invention has been shown and described in detail to illustrate the application of the principles of the invention, it will be understood that the invention may be embodied otherwise without departing from such principles.

What is claimed is:

1. An electronics component face plate screw capture method, comprising the steps of:

forming a face plate of sheet metal;

forming a hole in the face plate wherein the hole has a diameter sized to correspond to a portion of a screw, between a screw head and screw threading wherein the threading has a diameter greater than the hole diameter;

machining the face plate in an area surrounding the hole to form a tab region of a circular pattern, the tab region being formed by removing portions of the metal to leave tab portions of the metal, each tab portion being surrounded on a first side and a second side by an area wherein the metal has been removed;

pressing the tab portions upwardly from below the face plate to provide a raised up tab region, whereby the diameter of the hole expands to attain a new hole diameter which is greater than the diameter of the threaded portion of the screw;

inserting the screw through the hole of new hole diameter;

positioning an anvil with a hole drilled therein, below the face plate wherein the screw threading portion is inserted through the hole in the anvil with the face plate placed over the anvil, whereby the hole of said face plate and the hole of the anvil are substantially aligned;

applying pressure at the head of the screw whereby the raised up tab region is flattened to its original shape and the face plate hole reattains its original diameter, whereby the screw is captured with the head of the screw being maintained on one side of the face plate and the threaded portion of the screw maintained on the other side of the face plate.

2. An electronics component face plate screw capture method, according to claim 1, wherein:

the tab region provides a circular pattern which is approximately 2.85 times larger than the area of original hole.

3. An electronics component face plate screw capture method, according to claim 1, wherein:

said step of forming a tab region includes removing 50% of the metal in the area of the tab region.

4. An electronics component face plate screw capture method, according to claim 1, further comprising the step of:

applying indicia to said face plate after machining said face plate.

5. An electronics component face plate screw capture method, according to claim 1, further comprising the step of:

applying indicia to said face plate prior to drilling said hole.

6. An electronics component face plate screw capture method, according to claim 1, further comprising the step of:

applying the face plate with captured screw to an electronic component.

7. An electronics component face plate and captured screw assembly, formed by the steps of:

forming a face plate of sheet metal;

drilling a hole in the face plate wherein the hole has a diameter sized to correspond to a portion of a screw, between a screw head and screw threading, wherein the threading has a diameter greater than the hole diameter;

machining the face plate in an area surrounding the hole to form a tab region of a circular pattern, the tab region being formed by removing portions of the metal to leave tab portions of the metal, each tab portion being surrounded on a first side and a second side by an area wherein the metal has been removed;

pressing the tab portions upwardly from below the face plate to provide a raised up tab region, whereby the diameter of the hole expands to attain a new hole diameter which is greater than the diameter of the screw threading;

inserting the screw through the hole of new hole diameter;

positioning an anvil with a hole drilled therein, below the face plate wherein the screw threading is inserted through the hole in the anvil with the face plate placed over the anvil, whereby the hole of the face plate and the hole of the anvil are substantially aligned;

applying pressure at the head of the screw whereby the raised up tab region is flattened to its original shape and the face plate hole reattains its original diameter, whereby the screw is captured with the head of the screw being maintained on one side of the face plate and the threaded portion of the screw maintained on the other side of the face plate.

8. An electronics component face plate and captured screw assembly, comprising:

a screw having an undercut portion between a screw head and screw threading;

a face plate formed of sheet metal, said face plate having a hole with a diameter sized to correspond to said undercut portion of said screw, between said screw head and said screw threading wherein said screw threading has a diameter greater than the hole diameter;

screw fixing means for maintaining a screw in association with said face plate, said screw fixing means comprising a tab region of a circular pattern surrounding the hole in said face plate, the tab region being formed by removing portions of the metal to leave tab portions of the metal, each tab portion being surrounded on a first side and a second side by an area wherein the metal has been removed, the tab portion being raised by pressing the tab portions upwardly from below the face plate to provide a raised up tab region, whereby the diameter of the hole expands to attain a new hole diameter which is greater than the diameter of the threaded portion of the screw to allow the screw to be inserted in the hole of new hole diameter and the tab region is subsequently flattened such that the screw is captured by the tab region.

9. An electronics component face plate and captured screw assembly according to claim 8, wherein:

said tab region provides a circular pattern which is approximately 2.85 times larger than the area of the original hole.

10. An electronics component face plate and captured screw assembly according to claim 8, wherein:

said tab region is formed by removing 50% of the metal in the area of the tab region.

11. An electronics component face plate and captured screw assembly according to claim 8, further comprising:

indicia applied to said face plate.

12. An electronics component face plate and captured screw assembly according to claim 8, further comprising:

an electronic component, said face plate being connected to said electronic component via said screw.

\* \* \* \* \*